United States Patent [19]

English et al.

[11] Patent Number: 4,697,502
[45] Date of Patent: Oct. 6, 1987

[54] APPARATUS FOR MAKING VARIED STRENGTH BEVERAGES

[76] Inventors: Philip H. English, P.O. Box 1605, Avon, Colo. 81620; Anthony D. Szpak, Parma, Ohio 44134

[21] Appl. No.: 778,782

[22] Filed: Sep. 23, 1985

Related U.S. Application Data

[63] Continuation-in-part of Ser. No. 764,930, Aug. 12, 1985, abandoned.

[51] Int. Cl.[4] .................... A47J 31/02; A47J 31/10
[52] U.S. Cl. ........................................ 99/299; 99/306
[58] Field of Search ............... 99/295, 306, 299, 279, 99/300, 304, 307, 279; 426/433, 77, 79

[56] References Cited

U.S. PATENT DOCUMENTS

| | | | |
|---|---|---|---|
| 3,408,921 | 11/1968 | Freese | 99/295 |
| 3,446,624 | 5/1969 | Luedtke | 99/295 |
| 3,592,125 | 7/1971 | Flowers | 99/295 |
| 3,596,588 | 8/1971 | Moss | 99/295 |
| 4,056,050 | 11/1977 | Brown | 99/299 |
| 4,446,158 | 5/1984 | English | 99/295 |

Primary Examiner—Robert W. Jenkins
Attorney, Agent, or Firm—Oldham, Oldham & Weber Co.

[57] ABSTRACT

The coffee making apparatus is adapted to be positioned over a serving cup and comprises a mounting plate and funnel unit having a center opening therein and a support shoulder formed on the wall of the opening, an apertured adjustment ring is provided in rotary engagement with the mounting plate adjacent the support shoulder, which mounting plate has a by-pass opening formed in the shoulder and adjacent areas of the plate, which adjustment ring has a variable height outer wall formed on its periphery and constructed to adjustably open or close the end of the by-pass opening when the adjustment ring is rotated to position a taller part of the outer wall against the outlet of the by-pass slot, the shoulder receiving a coffee container and filter unit thereon and in substantial liquid tight association therewith.

17 Claims, 12 Drawing Figures

APPARATUS FOR MAKING VARIED STRENGTH BEVERAGES

This is a continuation-in-part of our prior application, Ser. No. 764,930, filed Aug. 12, 1985, now abandoned.

TECHNICAL FIELD

This invention relates to a coffee and beverage making apparatus using prepackaged quantities of coffee and other substances carried in a disposable filter wafer or unit adapted for making small quantities of a beverage at one time. The invention especially relates to apparatus for using the disposable filter wafer or unit so as to enable the user to obtain a desired varied strength beverage depending upon an adjustable setting of the apparatus.

BACKGROUND ART

Heretofore U.S. Pat. No. 4,446,158 has been obtained and discloses the use of a disposable individual coffee container and filter unit that includes a flat frame having an apertured center section with filter layers covering the top and bottom of the frame and used for retaining individual quantities of coffee or other material in compartments formed in the frame. This filter unit is positioned on the seat of a receptacle for such unit, which receptacle is adapted to be positioned on top of a cup or other container for receiving a quantity of liquid poured into the receptacle for flow through the filter unit for forming a desired beverage. In such a prior filter unit and apparatus for making a beverage, a by-pass opening can be provided therein whereby some of the liquid could flow through the apparatus without literally flowing through the beverage making material whereby the speed of making the product could be controlled depending upon the size of the by-pass slot. This partially controlled the strength of the beverage produced but a uniform or repeatable strength beverage would be produced in all instances by the apparatus. Inasmuch as it is well known that different people like different strengths of beverages, and particularly coffee, it would be very desirable if a type of coffee making apparatus could be provided wherein a varied strength product could be obtained. Possibly variable strength products could be obtained by the use of varied types of filter cartridges but this gets to be an expensive or cumbersome type of a manufacturing and marketing approach to the problem of making variable strength coffee and other beverages.

It is the general object of the present invention to provide a new and improved beverage making apparatus wherein a variable strength product can be obtained by use of the apparatus and by use of a standard type disposable, individual beverage making material container and filter unit.

Another object of the invention is to modify coffee making apparatus of a known type whereby a variable by-pass opening can be provided in the apparatus to aid in controlling the strength of the beverage produced and to aid in controlling the flow time of the beverage through the coffee making apparatus.

Yet another object of the invention is to provide a relatively inexpensive, uncomplicated modification in a beverage making apparatus for making small quantities of beverage such as coffee and wherein an adjustable by-pass opening is provided in the positioner ring or other part of the individual coffee container and filter units used.

Another object of the invention is to provide a movable member usually having a variable size flange or rib thereon for varying the flow through a by-pass opening in the beverage making apparatus, or to provide some type of apparatus with a plurality of different sizes of adjustable opening bypasses formed in the apparatus to enable a user to control the beverage making time and/or the strength of the beverage produced.

Still another object of the invention is to provide an easily adjusted ring in a mounting plate used for positioning the individual disposable coffee carrier and filter units thereon and wherein a rotary adjustment device is provided on the plate in association with a by-pass slot or opening for controlling flow of liquid through the by-pass slot and which adjustment ring may include a variable height cut-off shoulder formed on the outer periphery of the ring for engaging the outlet of the by-pass slot and controlling liquid flow therethrough.

The foregoing and other objects and advantages of the invention will be made more apparent as the specification proceeds.

Reference now is particularly directed to the accompanying drawings, wherein

When referring to corresponding members shown in the drawings and referred to in the specification, corresponding numerals are used to facilitate comparison therebetween.

BEST MODE FOR CARRYING OUT THE INVENTION

Figure 1:
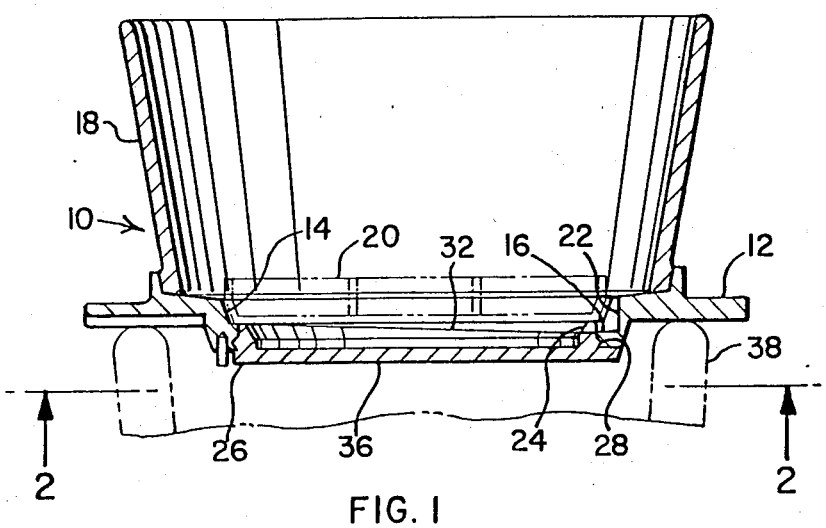
FIG. 1 is a vertical section through the coffee making apparatus of the present invention indicating a disposable coffee and filter carrier unit positioned therein.

The coffee making apparatus of the invention is adapted to be positioned over a serving cup or other container and comprises a mounting plate having center opening therein and a support shoulder formed on the wall of the opening, a liquid supply funnel being carried by and extending up from the mounting plate and outlining the center opening, an apertured adjustment ring provided in rotary engagement with the mounting plate adjacent the support shoulder, which mounting plate has a by-pass opening or slot formed therein or in the shoulder and adjacent areas of the plate, which adjustment ring, for example, has a variable height vertically extending outer wall formed on its periphery and is of a size and construction to close the outlet of the by-pass opening when the adjustment ring is rotated to position the taller part of the outer wall against the outlet or opening of the by-pass slot, the shoulder being adapted to receive a coffee container and filter unit thereon and to be in fairly liquid tight association therewith. "Liquid tight" meaning so as to retard any substantial leakage that would affect the strength of the beverage produced.

Particular attention now is directed to the details of the construction shown in the accompanying drawings. The coffee making apparatus of the invention is indicated as a whole by the numeral 10 and it includes a mounting plate 12 which has a center opening 14 therein and which has a support shoulder 16 formed on the wall of this opening 14. To facilitate pouring liquid through the opening 14 or members thereon, a section of a funnel 18 may be formed with or be suitably attached to plate 12 to outline the opening 14 and to extend upwardly therefrom.

The apparatus 10 is adapted to position a disposable coffee carrier and filter unit 20 thereon. This unit 20 is of the type shown in our prior U.S. Pat. No. 4,446,158 and the rate of flow of liquid through such unit 20 can be controlled, at least partially, by the size of and by the provision of a by-pass slot or opening 22 that is formed in the shoulder 16. Such opening or slot may extend radially beyond the shoulder 16 into the adjacent portion of the plate at the opening 14 and to the upper edge of the plate. The by-pass normally includes an outlet indicated at 24 in FIG. 1.

Figure 4:
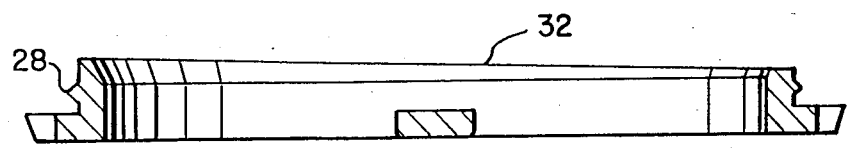
FIG. 4 is a vertical section through the adjustment ring of FIG. 3.

As an important feature of the invention, an adjustment ring 26 is rotatedly carried by the mounting plate 12 in the opening 14 thereof. Such adjustment ring 26 has a guide rib 28 thereon received in a complementary recess formed in the wall of the opening 14. The adjustment ring 26 has a variable vertical height or wall 30 provided thereon as best indicated in FIG. 4 and wherein a surface 32 of such ring is tapered or inclined through approximately 180° of the peripheral portion of this adjustment ring 26. But, any suitable arcuate length for the inclined surface 32 of the wall 30 may be used.

Figures 5, 6, 7:
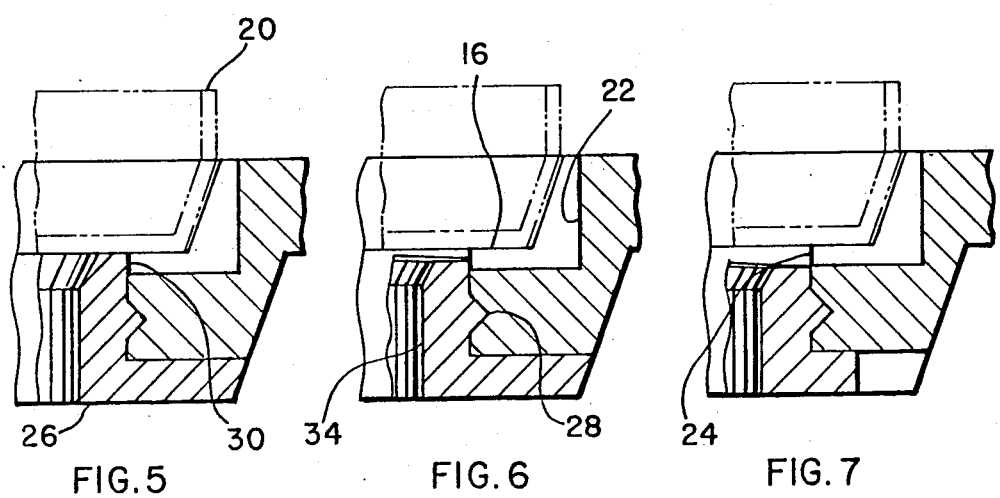
FIG. 5 is a fragmentary vertical section of a part of the apparatus showing it positioned for producing a strong beverage with the by-pass opening closed.
FIG. 6 is a cross-sectional view like FIG. 5 but with the apparatus positioned for forming a medium strength beverage.
FIG. 7 is a fragmentary vertical section of the apparatus like FIGS. 5 and 6 but for forming weaker or light beverage therein.

FIGS. 5, 6 and 7 of the drawings best show how this coffee carrier unit 20 rests upon the shoulder 16 and is normally supported thereby. The lower corner of the carrier unit 20 and the support area on the plate are complementary in shape. With rotation of the adjustment ring 26, the outlet 24 for the by-pass slot can be either partially opened, be fully closed or be fully open, as desired and with all variations therebetween. This is because the vertical wall of the adjustment ring is of such a height, as shown in FIG. 5, as to close the outlet 24 of the by-pass when the adjustment ring is in proper association with the mounting plate 12. However, when the adjustment ring is moved to its open position as shown in FIG. 7, then the outlet for the by-pass slot is fully open and some of the liquid poured into or onto the filter unit or carrier unit 20, or into the funnel 18 can flow through the by-pass slot and down through a center opening or openings 34 provided in the adjustment ring 26. This adjustment ring 26 has a fully open center portion usually except for a control bar or diametrically positioned rib 36 formed integrally therewith and connecting opposed portions of the ring.

Naturally the coffee making apparatus 10 of the invention is adapted to be positioned on any suitable container and a container 38 is indicated in FIG. 1 on which the apparatus is removably positioned.

It is desirable to provide only limited rotary action of the adjustment ring 26 and, hence, a stop 40 is provided on the mounting plate 12 and extends downwardly therefrom whereby a peripheral rib flange 42 on the adjustment ring, and which extends only approximately 180° thereon, can have its end portions against this stop 40 at opposite ends of the rotary action of the adjustment ring 26 in the carrier plate.

Figure 2:
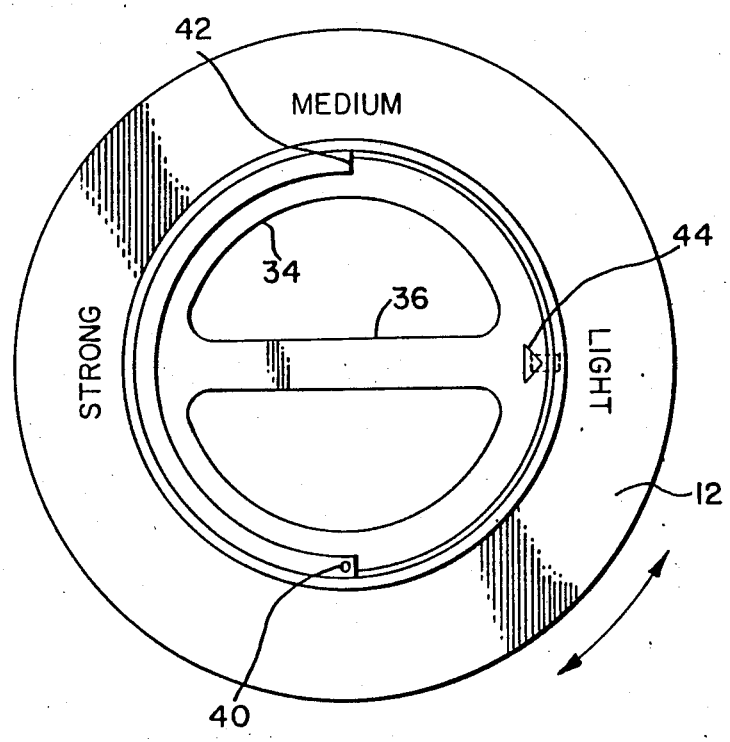
FIG. 2 is a bottom plan of the apparatus of FIG. 1.
Figure 3:
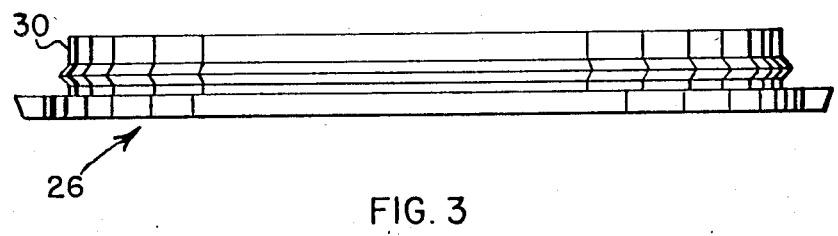
FIG. 3 is a front elevation of the adjustment ring of the apparatus.

It should be noted that FIG. 2 brings out that the strength of beverage to be provided is indicated on the lower surface of this mounting plate 12. Hence, before mounting the apparatus onto the cup 38, the individual would move the adjustment ring 26 so that a pointer 44 thereon would indicate whether a light, medium or strong beverage is to be formed. Then the apparatus would be positioned on the cup and the indicator 44, of course, indicates whether the by-pass opening is fully closed, medium open or fully open to aid in controlling the time of flow of the beverage through the apparatus.

While coffee has been particularly referred to in describing this invention, it can be used in any desired beverage making operation, such as tea, cocoa or other beverages but the invention is particularly adapted for use in making small quantities of coffee. The beverage forming material used naturally would be soluble and is formed in accordance with the teaching of our prior patent or is made in other manners as desired. The coffee carrier unit 20 rests on the shoulder 16 in substantial liquid or water tight engagement therewith for normal operation of the apparatus.

If desired, the wall 30 of the adjustment ring 26 can be made to have different steps of vertical height on its outer periphery, whereby a step type of a closure opening or closing action could be provided for the outlet for the by-pass but the gradual inclined type of action provided by the apparatus shown by the rib 36 has been found to be very satisfactory.

It will be realized that the strength of the beverage produced can be varied by the size of the by-pass opening, the amount of coffee or other material in the carrier unit 20, the type of coffee used, etc., but variation in the water flow rate through a by-pass is a convenient effective strength control for the beverage being produced.

Figure 8:
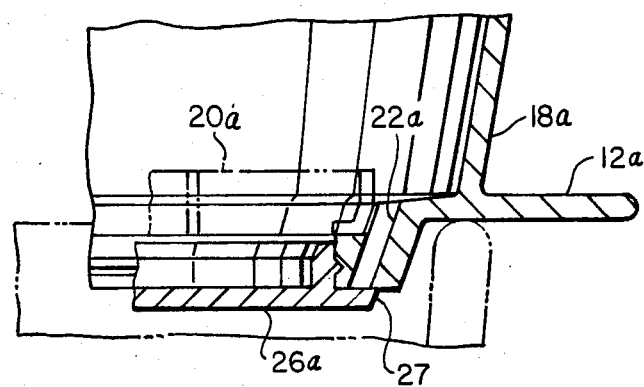
FIG. 8 is a fragmentary vertical section of a further modification of the invention.
Figure 9:
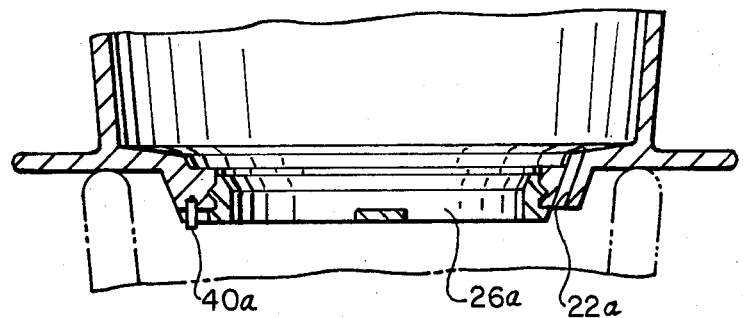
FIG. 9 is a vertical section of a different setting of the by-pass of FIG. 8.

Attention now is directed to FIGS. 8 and 9 of the drawings wherein a by-pass means is formed in the plate member of the apparatus and where it is controlled through rotary association of a flange on the adjustment ring 26a or equivalent member. Thus specifically, note the plate 12a shown in FIG. 8 and the presence of a by-pass slot 22a within a flat portion of the plate positioned internally of a funnel section 18a formed on the plate and funnel unit. This by-pass 22a has its open or discharge end in the lower surface of the plate and, to control the opening of the by-pass, a horizontally directed flange 27 is provided on the adjustment ring 26a and this flange is of a helical external shape to increase in a circumferential arc. Normally this helical portion of the flange 27 only needs be provided on substantially 180° or less of the adjustment ring, as desired. However, the flange 27 is of such size so as to have a shoulder that can abut against the stop 40a to terminate rotary direction for opening the by-pass or the ring can be turned through an arc so as to bring in a radially longer portion of the flange 27 into full closure engagement with the outlet of the by-pass all as shown best in FIG. 8. This is just another way that the size of the by-pass available for by-pass flow of the beverage making fluid can be obtained and the by-pass flow can be controlled as desired for making variations in strength of beverages where the beverage forming material must pass through a beverage forming container and filter unit such as the unit 20a shown in FIG. 8.

Figure 10:
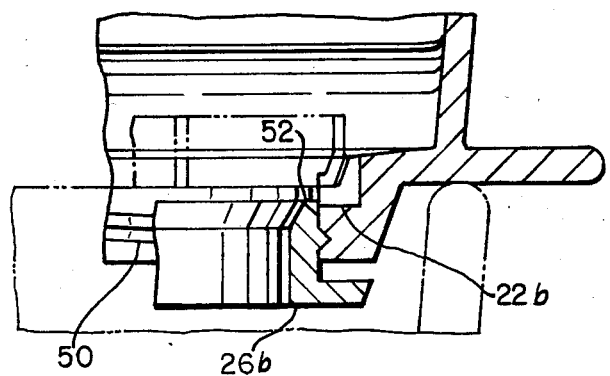
FIG. 10 is a section of an open by-pass of another modification of the invention.
Figure 11:
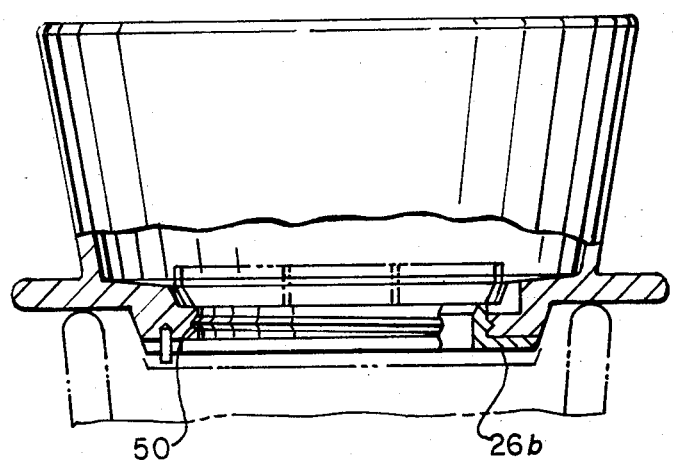
FIG. 11 is a section of the apparatus of FIG. 10 with the by-pass closed.
Figure 12:
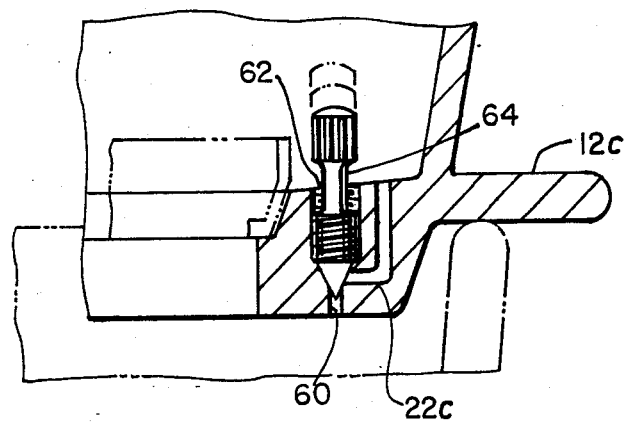
FIG. 12 is a fragmentary vertical section of a further modification of the invention with the open positions of the by-pass being indicated.

FIGS. 10 and 11 are of interest and this construction is quite similar to the construction of FIGS. 1 and 2, but in this instance, a typical helical thread 50 is formed on the adjustment ring 26b shown. Such helical thread 50 naturally engages a companion thread formed in the plate and funnel unit and its center opening. Such thread recess should be formed in the plate and funnel unit to extend down to the lower margin thereof for rotary engagement with the thread provided on the adjustment ring. By this construction, the by-pass 22b as shown in FIGS. 10 and 11 can either be opened by the top edge portion 52 of the adjustment ring, or when the rotary ring is raised vertically in relation to the support plate or mounting plate 12b and then the outlet of the by-pass can be closed by such upper wall section or portion 52 of the adjustment, as best indicated in FIG. 11.

Another type of adjustable by-pass can be formed in the mounting plate portion of the apparatus within the radial extent of the funnel section of the apparatus and can comprise a needle valve and associated by-pass. Thus, a by-pass 22c is formed in this mounting plate 12c and the by-pass connects to a bore 60 forming a lower end of a threaded aperture 62 used for receiving a needle valve 64 in rotary engagement with the mounting plate. The drawing indicates how the needle valve can be moved vertically to have a fully closed position for the by-pass, or the valve can be raised or partially open or fully open operating conditions for the by-pass and how it connects to this bore 60 below the needle valve of the unit. Again, this apparatus is provided for use with the coffee or beverage container and filter unit as shown in the figures of the drawings.

Other controllable by-pass openings could be provided in the coffee container and filter unit 20 or in the plate portion 12 within the funnel 18, as desired. Or a plurality of by-passes could be provided and be individually opened as desired to provide an adjustable by-pass for control of the flow through time for the liquid and the strength of the resultant beverage.

The thread or rib 28 can be made more of a trapazoidal shape in section to spring such rib into its companion seat in the wall of the opening 14 and such rib 28 need not be continuous to aid in assembly of the apparatus.

Use of the by-passes as shown can obtain variations in the coffee making period of from, for example, a one minute flow through for weak coffee to a three minute flow through for a strong beverage.

By the use of the apparatus of the invention it has been possible to provide relatively strong coffee or relatively light or weak coffee, all as desired by the user of the apparatus and obtained by a preset of the adjustment ring 26 in the apparatus. Hence it is believed that an easily used but effective and efficient type of small beverage making apparatus has been provided by the invention and that the objects of the invention have been achieved.

While in accordance with the patent statues, a preferred embodiment and best mode has been presented, the scope of the invention is not limited thereto, but rather is measured by the scope of the attached claims.

What is claimed is:

1. A coffee making apparatus for making small quantities of beverage and adapted to be positioned over a serving cup or other container comprising
   a mounting plate having a center opening therein and a support shoulder formed on a wall of said opening,
   an apertured adjustment ring in rotary engagement with said mounting plate below said support shoulder,
   said mounting plate having a by-pass slot formed in said shoulder and in a connecting portion of said wall positioned radially beyond said shoulder,
   said adjustment ring having a varied height vertically extending outer wall formed therein on the periphery thereof, which wall is of a size and construction to close the end of said by-pass slot when said adjustment ring is moved to position a taller part of said outer wall against the outlet of said by-pass slot, said shoulder being adapted to receive a coffee container and filter unit thereon.

2. A beverage making container as in claim 1 where said by-pass slot has an outlet formed by a portion of said slot extending to said center opening at a point below said shoulder.

3. A beverage making apparatus for making small quantities of beverage and adapted to be positioned over a serving cup or other container comprising
   a mounting plate having a center opening therein and a support area formed on a portion of said opening,
   a funnel device on said mounting plate and operatively connected to said center opening,
   an adjustment ring in rotary engagement with said mounting plate adjacent said support area,
   said mounting plate having a by-pass opening partly formed in said support area, and
   said adjustment ring having a varied height outer wall on its periphery which wall is of a size and construction to shut off or open said by-pass opening when said adjustment ring is rotated in said mounting plate, said support area being adapted to receive a beverage making container and filter unit thereon.

4. A beverage making apparatus as in claim 3 where said adjustment ring has an apertured center area and defines a constant horizontal plane when rotated.

5. A beverage making apparatus as in claim 3 where said adjustment ring is positioned partly level with and partly below said support shoulder.

6. A beverage making apparatus as in claim 3 where said by-pass opening has an outlet extending to said center opening below said support area.

7. A beverage making container as in claim 3 where said by-pass is formed in said mounting plate within said funnel device and spaced from said center opening, and a needle valve operatively engages said mounting plate and by-pass to adjustably control liquid flow therethrough.

8. A beverage making apparatus as in claim 3 where said by-pass opening is a slot formed in said mounting plate and extending into said support area, said by-pass slot being closable by rotation of said adjustment ring when a beverage making container and filter unit is positioned on said support area as it normally covers an upper portion of said slot.

9. A beverage making apparatus comprising
a member formed of a funnel portion and a mounting plate, said member having a center opening therein and a support area adjacent said opening and above at least a portion of said opening, a beverage filter wafer being positionable on said support area for liquid flow therethrough,
said member and a said beverage filter wafer forming beverage making means,
said beverage making means having a variable by-pass means formed therein whereby adjustment of said by-pass controls the rate of liquid flow through said beverage making means and the strength of the beverage produced.

10. A beverage making apparatus as in claim 1 where said outer wall is of uniform height, and said adjustment ring has a helical thread engagement with said mounting plate.

11. A beverage making apparatus as in claim 9 where a ring means operatively engages said member and is in rotary engagement with said center opening, said ring having a section for variable closure engagement with said by-pass means to vary the liquid flow rate through the apparatus.

12. A beverage making apparatus as in claim 11 where said section comprises a variable length radially extending flange.

13. A beverage making apparatus as in claim 11 where said ring means has a tubular upper end section and a helical thread engagement with said mounting plate.

14. A beverage making apparatus as in claim 9 where the support area includes a support shoulder and a said beverage filter wafer has a peripheral portion in substantial water tight engagement therewith.

15. A beverage making apparatus comprising
a member formed of a funnel portion and a mounting plate, said funnel portion having a lower end section having a center opening therein and a center opening wall; a support area adjacent said opening,
a beverage making container and unit being positionable on said support area for liquid flow therethrough,
a control ring rotatably engaging said funnel portion wall,
said member, said control ring and said beverage making container and unit forming beverage making means,
said beverage making means having a variable by-pass means formed therein whereby adjustment of said by-pass can control the rate of liquid flow from said funnel portion through said beverage making means and the strength of the beverage produced.

16. A beverage making apparatus as in claim 15 where said control ring has a section for variable closure engagement with said by-pass means to vary the liquid flow rate through said by-pass means and hence the flow rate through said beverage making means.

17. A beverage making apparatus as in claim 15 where said variable by-pass is an open top slot formed in said end section wall and extending into said support area, said by-pass slot being controllable by rotation of said control ring to open and close said slot when a beverage making container and filter unit is positioned on said support area, said filter unit normally covering an upper portion of said slot.

* * * * *